Dec. 16, 1930.   L. A. PINCK   1,784,945
METHOD OF NITRATING CELLULOSE
Filed June 27 1928
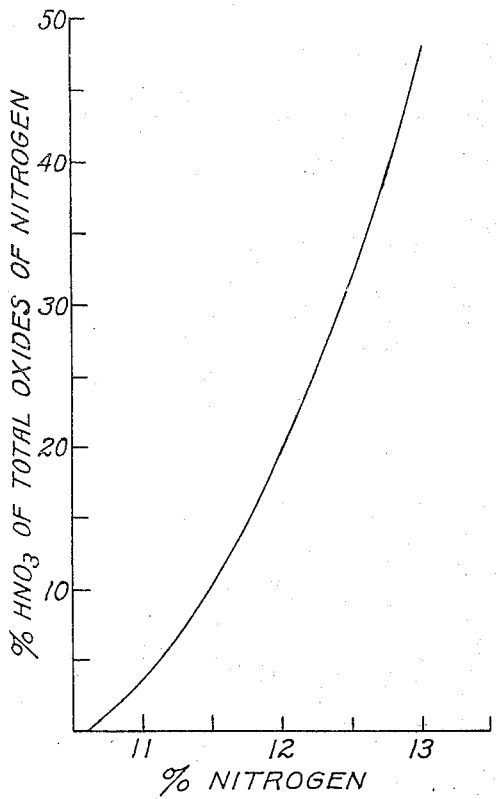
GRAPH 1 - THE EFFECT OF HNO₃ ON CELLULOSE NITRATIONS
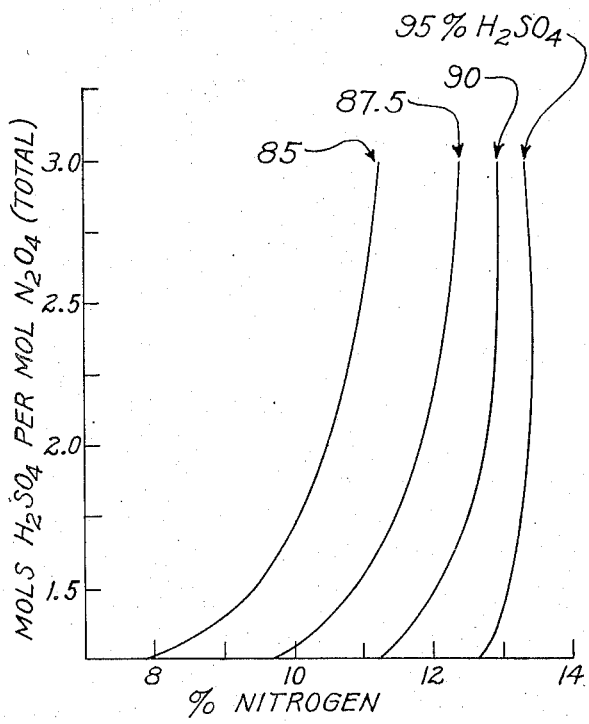
GRAPH 3 - NITRATIONS WITH 85-95 % H₂SO₄, N₂O₄ AND 15% OF N₂O₄ AS HNO₃
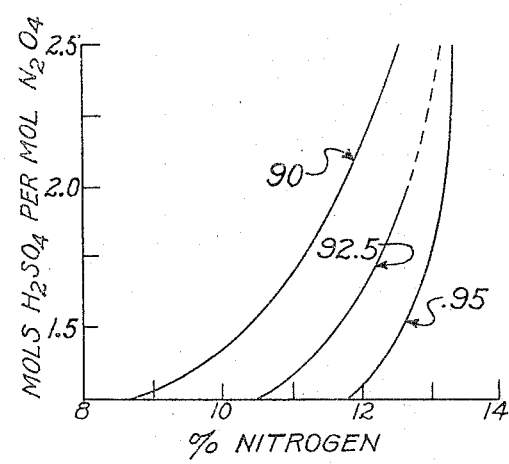
GRAPH 2 - NITRATIONS WITH 90-95% H₂SO₄ AND N₂O₄
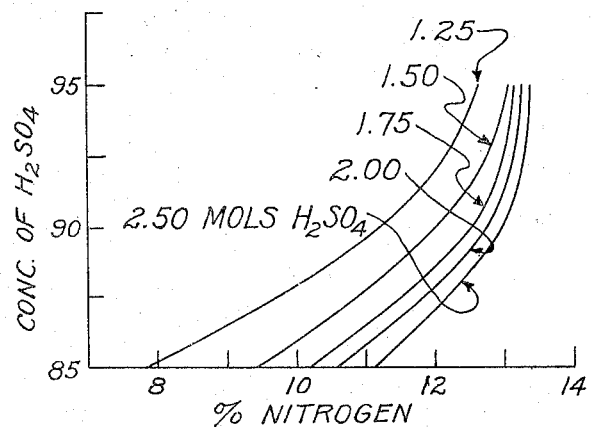
GRAPH 4 - NITRATIONS WITH 85-95% H₂SO₄, N₂O₄ AND 15% OF N₂O₄ AS HNO₃
Louis A. Pinck   Inventor Patented Dec. 16, 1930

1,784,945

UNITED STATES PATENT OFFICE

LOUIS A. PINCK, OF WASHINGTON, DISTRICT OF COLUMBIA

METHOD OF NITRATING CELLULOSE

Application filed June 27, 1928. Serial No. 288,795.

(GRANTED UNDER THE ACT OF MARCH 3, 1883, AS AMENDED APRIL 30, 1928; 370 O. G. 757)

This application is filed under the act approved April 30, 1928, and the invention herein described, if patented, may be manufactured and used by or for the Government for governmental purposes without the payment to me of any royalty thereon.

This invention relates to a process of nitrating cellulose.

It is the object of this invention to provide a method of nitrating cellulose by the use of a nitrating mixture in which the commonly employed nitric acid is partially or completely replaced by oxides of nitrogen. Worden, in his work entitled "Nitrocellulose industry", vol. 1, p. 33, says that nitrogen peroxide in the liquid form has a very destructive action upon cellulose. However, in the present process, cellulose is nitrated rapidly with oxides of nitrogen without oxidation and with good yields or nitro compounds, when sulphuric acid is present.

Ordinarily, cellulose is nitrated by treating it with a mixture of nitric acid, sulphuric acid and water. The sulphuric acid in the nitrating mixture of the present invention, serves a purpose quite distinct from that in the case of the well known mixed acid nitration. It not only functions as a dehydrating reagent, but it enters into the reaction chemically, as shown in the following equation:

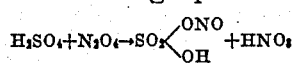

Nitric acid is formed in situ, and reacts with the cellulose and the sulphuric acid inhibits the destructive action on the cellulose by the oxides of nitrogen.

By "oxides of nitrogen" as referred to in this specification and claims, is meant such fluids as are obtained, for example, by the arc process of nitrogen fixation, oxidation of ammonia or other processes, and consisting principally of $NO_2$ and $N_2O_4$. While $NO_2$ and $N_2O_4$ substantially free from other oxides of nitrogen are the preferred reagents in the present process, it will be understood that $NO_2$ and $N_2O_4$ containing other oxides in quantities such as are liable to occur as impurities in the preparation of this reagent, may be used without departing from the spirit of this invention.

It is well known that at certain temperatures nitrogen peroxide ($NO_2$) polymerizes to form nitrogen tetroxide ($N_2O_4$). The amount of nitrogen tetroxide in equilibrium with nitrogen peroxide depends upon the temperature and pressure. For the purpose of this disclosure and claims the term "nitrogen tetroxide" will designate all states of aggregation of the chemical species nitrogen peroxide and nitrogen tetroxide.

Furthermore, the oxides of nitrogen may contain some nitric acid resulting from an interaction of the oxides with the moisture that is usually present. The quantity of moisture may be varied at will and the amount of nitric acid formed will vary accordingly.

The results obtained in the process of this invention are illustrated graphically, in the accompanying drawing.

Graph 1 shows the effect of varying the amount of free nitric acid in the nitrating mixture.

Graph 2 shows the effect of nitrating cellulose with a mixture of nitrogen oxides practically free from nitric acid, and sulphuric acid of concentrations ranging between 90 per cent and 95 per cent.

Graphs 3 and 4 show the effect of nitrating cellulose with a mixture of nitrogen oxides containing 15 per cent of the $N_2O_4$ as nitric acid, and sulphuric acid of concentrations ranging between 85 per cent and 95 per cent.

When nitric acid, aside from that formed by the interaction of oxides of nitrogen with sulphuric acid, is used in the nitrating mixture, the degree of nitration is markedly increased. It is readily seen in Graph 1 that the greater the amount of nitric acid used corresponds to a greater degree of nitration; however, the specific effect of each increase in concentration of free nitric acid decreases with increasing concentrations. By the term "free nitric acid" I mean the nitric acid present in the oxides of nitrogen or that added to the nitrating mixture of sulphuric acid and nitrogen oxides.

A knowledge of the wide application of the method disclosed, may be gained by studying Graphs 2, 3, and 4. These curves show that there is a definite relationship between the degree of nitration and the concentration of the sulphuric acid as well as the molecular ratio of the sulphuric acid with respect to the $N_2O_4$. It was found that (1) when oxides of nitrogen practically free from nitric acid are used, the concentration of the sulphuric acid may range between 95 and 90 per cent, and (2) when free nitric acid is present in the nitrating mixture, lower concentrations of sulphuric acid may be used. For example, if 15% of the $N_2O_4$ is replaced by nitric acid, the concentration of the sulphuric acid may range between 95 and 85 per cent. The presence of free nitric acid not only increases the degree of the nitration but it also permits the use of sulphuric acid of lower concentrations which otherwise would have a deleterious action on the cellulose or its nitric esters. It is to be noted that in nitrations with 1.75 mols. or more of 95 per cent sulphuric acid, the effect of free nitric acid is not significant.

It was also found that the molecular ratio of sulphuric acid to nitrogen tetroxide should be in the range of 1.25 to 3.0. Decomposition may take place beyond these limits, especially with the lower concentrations of sulphuric acid. By means of Graphs 3 and 4, the degree of nitration of any concentration of sulphuric acid ranging between 85 and 95 per cent and for any molecular ratio of sulphuric acid ranging between 1.25 and 3.0 mols. per mol. of total $N_2O_4$ may be computed.

A study of the graphs will show that the same or higher degrees of nitration may be obtained by using a larger quantity of sulphuric acid of a lower concentration as compared with a smaller quantity of a more concentrated acid. For example, in Graph 2 one will find three different compositions of the nitrating mixture for the preparation of a nitrocellulose having 12 per cent nitrogen, and in Figure 4 one will find five. However, the proportions are not limited to those represented by the points in the curves. For practical purposes any proportion which is represented by a point preferably within the area bounded by the outermost curves, may be used.

Other factors which influence the degree of nitration are (1) the ratio of cellulose to nitrating mixture, (2) time, and (3) temperature. It was found that the best results were obtained by using 1 part of cellulose to 15 parts of oxides of nitrogen, by weight. For any considerable increase of cellulose there is a decrease in the degree of nitration. The time of nitration of course is dependent upon the temperature of the reaction. If nitration is carried out at 30° C., the maximum degree of nitration is effected in approximately four hours, and at 25° C., in approximately five hours. However, the reactions may be terminated, if desired, before they go to completion. At higher temperatures, the reaction will go to completion in considerably less time.

Furthermore, the course of the nitration is greatly affected by the physical form of the cellulose. Filter paper is much slower in attaining its maximum degree of nitration than cotton-wool and the thicker and denser the paper, the more is the nitration delayed.

The following examples are given to illustrate the manner of carrying out the process of this invention in the preparation of a nitrocellulose having 12 per cent nitrogen:

*Example 1.*—Gaseous or liquid oxides of nitrogen are passed into 95 per cent sulphuric acid until the proportion of oxides of nitrogen calculated as nitrogen tetroxide to sulphuric acid is 1 molecule per 1.29 molecules. Since this reaction is exothermic, provision is made for proper cooling and agitation or else the mixing of the reagents should be carried out with agitation in a closed system to avoid the escape of the oxides of nitrogen before all of it has completely reacted with the sulphuric acid. Then approximately 1 part by weight of cellulose is added to an amount of the above solution corresponding to 15 parts by weight of oxides of nitrogen and the reaction is allowed to proceed for approximately four to five hours at 25 to 30° C. The nitration may be facilitated by agitation, centrifuging or steeping, this being dependent upon the type of nitrator employed. The nitrocellulose formed is then removed from the nitration vessel and treated in the usual way.

*Example 2.*—Gaseous or liquid oxides of nitrogen, in which 15 per cent of the $N_2O_4$ is in the form of nitric acid, is passed into 90% sulphuric acid until the proportion of the total oxides of nitrogen calculated as nitrogen tetroxide to sulphuric acid is 1 molecule to 1.50 molecules. As an alternative, free nitric acid may be added to the sulphuric acid or to the solution of the oxides of nitrogen in sulphuric acid, in the proportions designated above. The method of procedure and ratio of cellulose to total oxides of nitrogen are similar to that specified in Example 1.

In a similar manner, such cellulosic substances as hydrocellulose, oxycellulose, etc., may be nitrated.

The process described is advantageous in that there is a direct utilization of the oxides of nitrogen obtained by the ammonia oxidation or the arc processes. This avoids the necessity of going through the expensive steps of producing nitric acid suitable for nitration purposes. The process is economically superior to the existing methods, especially when the cost of synthetic nitric acid is on a competing basis with nitric acid produced from Chile nitrate.

What I claim is:

1. A process of nitrating cellulosic substances, which comprises reactions obtained by passing oxides of nitrogen into sulphuric acid until the molal ratio of the latter per mol. of nitrogen tetroxide is from approximately 1.25 to 3.0, and then adding cellulosic substances.

2. A process of nitrating cellulosic substances, which comprises reactions obtained by passing oxides of nitrogen containing nitric acid into sulphuric acid until the molal ratio of the latter per mol. of nitrogen tetroxide is from approximately 1.25 to 3.0 and then adding cellulosic substances.

3. A process of nitrating cellulosic substances which comprises reactions obtained by adding oxides of nitrogen and nitric acid to sulphuric acid so that the molal ratio of the latter per mol. of total nitrogen tetroxide is from approximately 1.25 to 3.0 and then adding cellulosic substances.

4. A process of nitrating cellulose, which comprises in passing oxides of nitrogen into sulphuric acid, then adding cellulose and carrying the reaction substantially to completion.

5. A process of nitrating cellulose, which comprises bringing about reactions between cellulose, oxides of nitrogen containing nitric acid, and sulphuric acid at temperatures ranging between 25 and 30° C. for a period of 4 to 5 hours.

LOUIS A. PINCK.